US008274400B2

(12) United States Patent
Wilson et al.

(10) Patent No.: US 8,274,400 B2
(45) Date of Patent: Sep. 25, 2012

(54) METHODS AND SYSTEMS FOR DOWNHOLE TELEMETRY

(75) Inventors: Colin A. Wilson, Surrey (GB); Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 479 days.

(21) Appl. No.: 12/652,713

(22) Filed: Jan. 5, 2010

(65) Prior Publication Data

US 2011/0163891 A1 Jul. 7, 2011

(51) Int. Cl.
*G01V 3/00* (2006.01)

(52) U.S. Cl. .................. 340/854.9; 166/244.1; 385/12; 340/853.1

(58) Field of Classification Search ............... 385/12; 166/244.1; 340/853.1, 854.9
See application file for complete search history.

(56) References Cited

U.S. PATENT DOCUMENTS

| | | | | |
|---|---|---|---|---|
| 5,394,492 A * | 2/1995 | Hwang | ........................... | 385/33 |
| 5,778,114 A * | 7/1998 | Eslambolchi et al. | .......... | 385/12 |
| 6,249,627 B1 * | 6/2001 | Bond et al. | ...................... | 385/49 |
| 6,813,403 B2 * | 11/2004 | Tennyson | ........................ | 385/12 |
| 6,933,491 B2 * | 8/2005 | Maida, Jr. | ................ | 250/227.14 |
| 2002/0131734 A1 * | 9/2002 | Stark | ............................. | 385/100 |
| 2003/0052258 A1 * | 3/2003 | Russell et al. | ........... | 250/227.17 |
| 2004/0258377 A1 * | 12/2004 | Berkey et al. | ................. | 385/123 |
| 2005/0100307 A1 * | 5/2005 | Desmone | ...................... | 385/147 |
| 2007/0110355 A1 * | 5/2007 | Jaaskelainen et al. | .......... | 385/12 |

* cited by examiner

*Primary Examiner* — Jean B Jeanglaude
(74) *Attorney, Agent, or Firm* — Jianguang Du; Jody DeStefanis (57) ABSTRACT

Methods and apparatus for facilitating optical communications and sensing, with downhole optical or other sensors, in high temperature oilfield applications. The apparatus can include a downhole telemetry cartridge for downhole use at temperatures in excess of about 115 degrees Celsius. The apparatus can also include a downhole light source optically connected to the telemetry cartridge. The light source may include at least one remotely pumped laser optically connected to a surface pump laser via optical fiber(s). The remotely pumped laser may drive the downhole optical or other sensors for their operations.

20 Claims, 8 Drawing Sheets

METHODS AND SYSTEMS FOR DOWNHOLE TELEMETRY

BACKGROUND

The present disclosure relates generally to downhole systems and methods for gathering data from subterranean formations. More particularly, the present disclosure relates to downhole systems having laser devices that are configured or designed for high-temperature operations, within a borehole, at temperatures in excess of about 115 degrees Celsius.

Logging and monitoring boreholes has been done for many years to enhance and observe recovery of oil and gas deposits. In the logging of boreholes, one method of making measurements underground includes attaching one or more tools to a wireline connected to a surface system. The tools are then lowered into a borehole by the wireline and drawn back to the surface ("logged") through the borehole while taking measurements. The wireline is usually an electrical conducting cable with limited data transmission capability. Similarly, permanent monitoring systems are established with permanent sensors that are also generally attached to an electrical cable.

Demand for higher data transmission rates for wireline logging tools and permanent monitoring systems is growing rapidly because of higher resolution sensors, faster logging speeds, and additional tools available for a single wireline string. Although current electronic telemetry systems have evolved, increasing the data transmission rates from about 500 kbps (kilobits per second) to 2 Mbps (megabits per second) over the last decade, data transmission rates for electronic telemetry systems are lagging behind the capabilities of the higher resolution sensors. In fact, for some combinations of acoustic/imaging tools used with traditional logging tools, the desired data transmission rate is more than 4 Mbps.

In addition, while higher data transmission rates are desirable, many tools in current use would have to be completely reworked or replaced to incorporate new data transmission technologies. It would be desirable to facilitate faster data transmission rates with minimal changes to existing tools and equipment.

One technology that has been investigated for increased data transmission rates is optical communication. Optical transmission rates can be significantly higher than electronic transmission rates. However, even if fiber optic cables are used for data transmission, the issue of operating the downhole sensors and electronics in downhole high-temperature environments remains. The downhole sensors and/or electronics often are required to operate for extended periods of time at temperatures in excess of about 115 degrees Celsius and sometimes in excess of about 200 degrees Celsius.

Some sensors of a permanent system are often deployed with a monitoring tool that extends downhole and is integrally attached to the borehole casing. The attachment is typically accomplished with a mechanical surface force clamping device and the sensors are typically housed in a side passageway or lateral extending section associated with the sensor housing or production tubing which is laterally displaced from the primary flow passageway through the production tubing.

Many monitoring tools for permanently deploying seismic sensor arrays downhole are single level monitoring tools. However, due to the complex subsurface formation and strata and the various levels of the multiple production zones and reservoirs, multilevel monitoring tools are also required to monitor various levels simultaneously. The monitoring tool that deploys the sensor arrays will typically include a plurality of sensor housings or shuttles where each shuttle contains at least one sensor.

Similarly, in the area of borehole logging, the number of transmitters and receivers and the distance between transmitters and receivers has been increasing to improve the ability to detect formation characteristics in the undisturbed formation farther from the borehole. One method to get deeper penetration is to increase the distance between source and receivers, such that the receivers are detecting signals that are returned from further distances in the borehole.

Furthermore, oilfield application of fiber optics sensors has been progressing in recent years for monitoring of certain parameters. However, many downhole applications require high temperature operations, and optical devices such as laser degrade rapidly or do not operate properly at high temperatures. Therefore, use of fiber optics for communication between surface systems and downhole tools, as well as use of downhole sensors, in high-temperature conditions, within a borehole, has been limited.

In certain embodiments, the present disclosure proposes efficient and reliable methods and systems for transmitting data from a downhole tool at high temperature using optical fibers. In this, the methods and systems disclosed herein provide downhole laser sources that are suitable for high-temperature applications. One of the problems addressed herein is that of a downhole source. Although semiconductor lasers are utilized as sources for optical communications, the temperature range at which such sources can operate is limited, in particular, when the sources operate on a continuous basis. Most other types of laser cannot be modulated directly through their supply current, as can semiconductor lasers.

Accordingly, it will be appreciated that there exists a desire to improve upon conventional downhole methods and systems in order to improve sensing of downhole parameters and the transmission of downhole data.

The limitations of conventional designs noted in the preceding are not intended to be exhaustive but rather are among many which may reduce the effectiveness of previously known telemetry mechanisms. The above should be sufficient, however, to demonstrate that downhole data telemetry structures existing in the past will admit to worthwhile improvement.

SUMMARY OF THE DISCLOSURE

The present disclosure addresses the above-described deficiencies and others. Specifically, the present disclosure provides devices for downhole, high-temperature systems and methods that may be particularly useful for subterranean investigation tools.

Embodiments disclosed herein provide methods and systems for downhole telemetry in high-temperature environments. In particular, some embodiments of the present disclosure provide methods and systems having a downhole laser that is remotely pumped from the surface through an optical fiber. In aspects of the present disclosure, the remotely pumped downhole laser is a downhole light source optically connected to a telemetry cartridge that is configured or designed for downhole use at temperatures in excess of about 115 degrees Celsius. In other aspects herein, one or more sensor or transducer is directly coupled to the remotely pumped downhole laser so that sensing signals from the sensor or transducer change characteristics of the remotely pumped laser. In this, the downhole functionality comprises a remotely pumped laser and downhole information is imparted onto the laser output by modulation of one of its operating characteristics.

In certain embodiments of the present disclosure, a remotely pumped laser, for example, a waveguide laser, is utilized and a parameter in its output is modulated by applying a modulation to the laser cavity. The remotely pumped laser comprises a device having a gain medium, for example, a rare-earth dopant, in a host medium. Optical feedback is provided, for example, with mirrors on either end of the cavity. The power to operate the laser, i.e., the pump power, is provided by optical power that is transmitted down an optical fiber at a wavelength corresponding to an appropriate absorption band of the rare-earth dopant. The parameter to be modulated may be, for example, the emission frequency, the intensity, the phase or the state of polarization of the light emerging from the laser.

In certain aspects of the present disclosure, the gain medium may also be a waveguide, so that the optical fields are well confined, and the pump energy interacts efficiently with the gain medium and the lasing output.

In other aspects herein, a rare-earth-doped fiber, for example, similar to those used in optical amplifiers, may be used. In yet other aspects of the present disclosure, a doped-glass or crystal planar waveguide device may be utilized for the purposes described herein.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

As used throughout the specification and claims, the term "downhole" refers to a subterranean environment, particularly in a wellbore, such as in the field of oilfield exploration and development, management of oil and water reservoirs, sequestration of substances such as $CO_2$, and geothermal applications. "Downhole tool" is used broadly to mean any tool used in a subterranean environment including, but not limited to, a logging tool, an imaging tool, an acoustic tool, a permanent monitoring tool, and a combination tool. A "long" wavelength refers to light wavelengths over 940 nm. "Optical device" is used broadly to mean any device that creates, manipulates, or measures electromagnetic radiation, i.e., a device for producing or controlling light. "High-temperature" refers to downhole temperatures in excess of about 115 degrees Celsius. The words "including" and "having" shall have the same meaning as the word "comprising."

As is generally known, conventional laser devices are typically configured or designed to operate at about 85 degrees Celsius. Such conventional devices are not suited for efficient operation, and in some cases are unable to operate, at elevated temperatures, i.e., above 85 degrees Celsius, for example, at temperatures in excess of about 115 degrees Celsius. In this, the inherent low temperature operating range (85 degrees Celsius or less) of known downhole optical devices restricts the use of these devices in high-temperature downhole applications that require optical components to operate at temperatures in excess of, for example, 115 degrees Celsius and, in some cases, in excess of 150 degrees Celsius.

Typically, in high temperature operations an active cooling device, such as a thermo electric cooler (TEC), is needed for the laser to operate. An active cooling device requires additional components for temperature control and power. Additional complexity in the tool architecture reduces reliability.

High-temperature devices of the type disclosed herein simplify tool design and improve the reliability of the downhole tools by eliminating in most instances the need for active cooling of the laser devices in high temperature applications.

The present disclosure provides some embodiments directed towards improving, or at least reducing, the effects of one or more of the above-identified problems and others that are known in the art. In one of many possible embodiments, a high-temperature downhole oilfield sensor system is provided. In other possible embodiments, a high-temperature downhole optical telemetry system is provided. The high-temperature downhole oilfield systems comprise a downhole remotely pumped laser device and an optical fiber extending between the downhole system and a surface data acquisition system, wherein the downhole remotely pumped laser is optically connected to a surface pump laser.

The principles described herein contemplate methods and apparatus facilitating optical communications and sensing, with optical sensors or otherwise, using downhole tools and sensors in high temperature applications. The use of fiber optics between downhole tools and the surface provides higher data transmission rates than previously available. The principles described herein facilitate fiber optic sensing and communications between downhole tools and sensors, and associated surface systems, even in high temperature environments. Some of the methods and apparatus described below include systems that are capable of using long wavelength, single mode communications, which reduces dispersion and loss over long distances.

As previously discussed above, demand for higher resolution and faster data transmission for logging tools is growing rapidly. Longer tool combinations, and a demand for better imaging, means that currently available telemetry bandwidth is inadequate. The present disclosure provides enabling technology for high speed telemetry platforms and sensing systems in high-temperature downhole environments. The solutions proposed herein reduce tool and system costs, improve tool reliability by simplifying the telemetry architecture, and provide direct high speed communications to the tool sensors. The tool architecture described herein provide significant expansion capability to existing tool architecture allowing greater functionality and services to be provided by existing tools. In this, as a consequence of the ideas in the present disclosure new tool designs and applications are possible that were not realizable with the presently available telemetry capabilities. For example, a key component for an optical telemetry system is a reliable high speed optical source. The devices disclosed herein provide high speed communications in high-temperature downhole applications without a need for active cooling of the devices.

Aspects disclosed herein include the benefits of fiber optic communication and sensor systems combined with a plurality of devices attached along a coiled tubing, or a cable line, wire line, slickline, or any other suitable downhole deployment means.

Utilization of fiber optic sensor systems provides benefits from many advantages offered by fiber optic systems. For example, fiber optic systems can operate passively and therefore downhole electronics and associated power from the surface to operate the downhole electronics are not required. The ability to eliminate downhole electronics improves reliability of the downhole sensor systems particularly in higher temperature environments. The electronics necessary for operating the sensor arrays can be located at the surface and since the surface electronics can be relatively expensive, they can be shared with other well and utilized for multiple downhole fiber optic sensor systems. Also, fiber optic technology allows for a smaller profile and lighter weight system. Still further, all of these capabilities are advantageous for acoustic and seismic imaging applications which require a large sensor array with high data transmission capabilities. In this regard, fiber optic sensors can also support multi-functional measurements through the fiber optic line. This feature has great advantage in wire line or cable line applications as well as production and formation monitoring sensor systems.

For purposes of this disclosure, when any one of the terms wire line, cable line, slickline or coiled tubing or conveyance is used it is understood that any of the above-referenced deployment means, or any other suitable equivalent means, may be used with the present disclosure without departing from the spirit and scope of the present disclosure.

Figure 1:
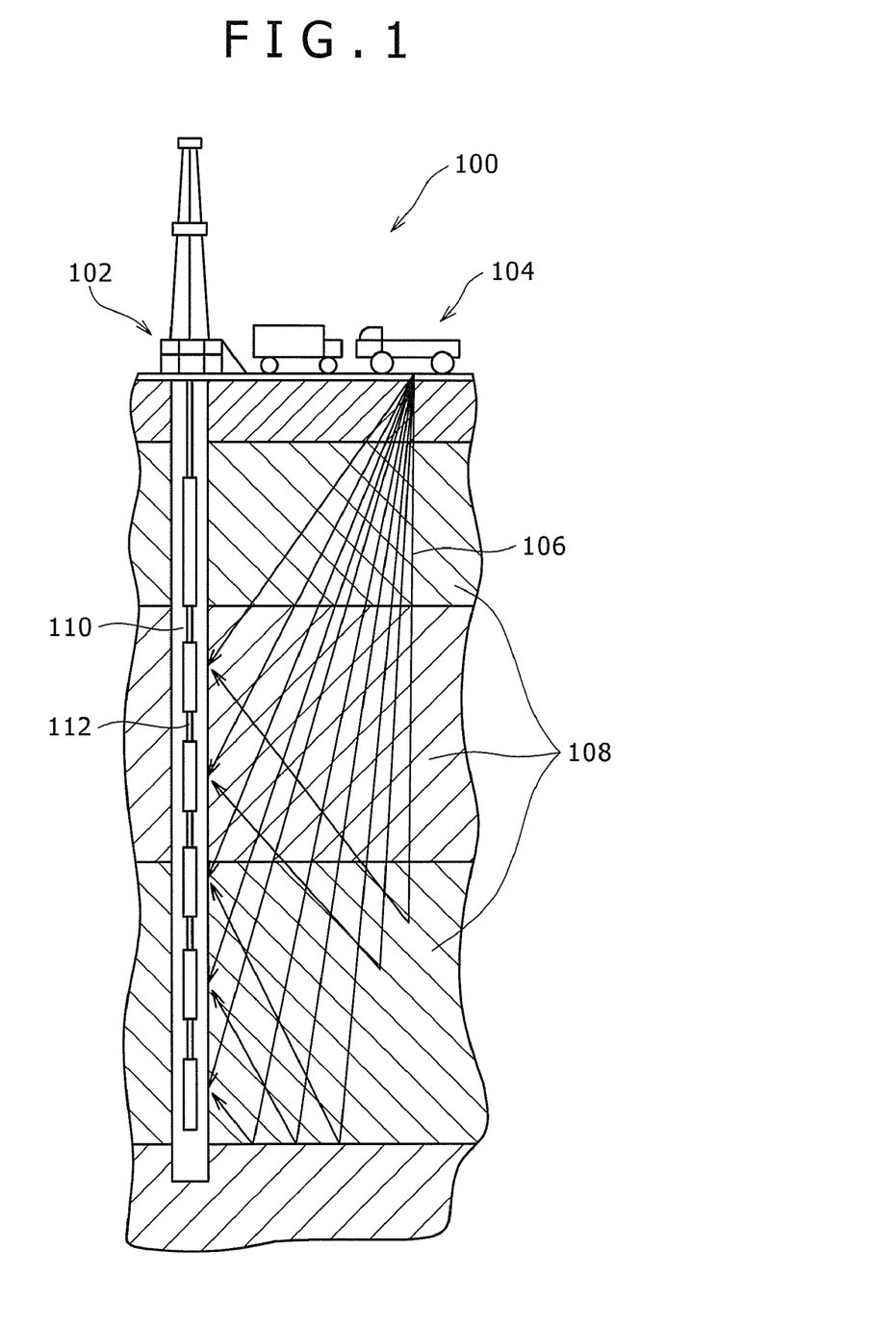
FIG. 1 is a schematic representation of a typical well site with a borehole traversing subsurface formations.

Referring to FIG. 1, a schematic depiction of a well site is shown with a diagrammatic representation of a cross section of the subsurface formations traversed by a borehole. The subterranean system 100 includes well instrumentation 102 at the surface including all associated instrumentation and monitoring systems. Also shown at the surface is a surface source 104 which is depicted as a vibration vehicle. The plurality of lines 106 are intended to represent excitations or seismic vibrations traveling through the subsurface formations producing seismic data that can be sensed by downhole sensor arrays. The present systems and methods can be utilized to record seismic data for conducting a seismic survey of the subsurface formations 108. Aspects herein can also be utilized to control and monitor operations during production by monitoring seismic data from the various subsurface formations, regions, and zones. In the monitoring capacity, the disclosure herein can be utilized to optimize production of the well. The placement of the well bore 110 can be strategically located based on known seismic survey data that may have been previously obtained. Optimal placement of the well bore is desired such that optimal recording of seismic data for the subsurface formations of interest can be obtained.

Once the well bore has been established, a wire line (cable line) 112, a coiled tubing or other conveyance can be spooled to extend down through the well bore where the plurality of sensor arrays are positioned along the wire line 112. Also, note that the wire line with the seismic sensors attached thereto can be extended as the well bore is being established. The principles described herein can be either permanently deployed for continuous production well monitoring or can be temporarily deployed for performing a subsurface seismic survey and then retracted. Permanent deployments enable continuous monitoring of production well operations. Once the wire line and the plurality of sensor arrays are in position, seismic data can begin to be gathered. If production ceases at the well or for some other reason seismic monitoring is no longer required, the system can be retracted and reutilized elsewhere. Note that the exemplary systems presented herein to describe embodiments are for the purpose of illustration and ease of understanding the apparatus and methods. The illustrations shown and described herein should not be construed to be limiting in any way with respect to the scope of the claims.

Figure 2:
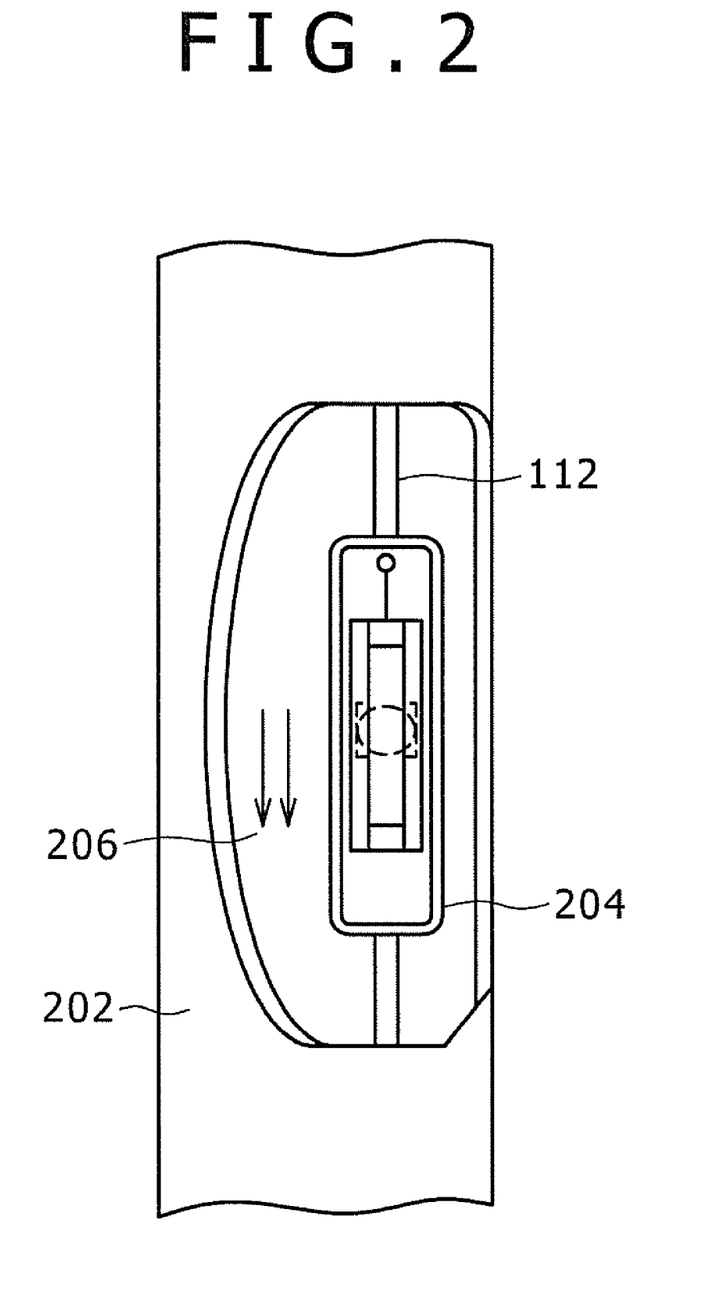
FIG. 2 is an enlarged diagrammatic view of a cutaway from a portion of the borehole revealing a cable line and the shuttle attached thereto.

Referring to FIG. 2, a view of a cutaway from a portion of the borehole casing is shown with the cable line or wire line having a shuttle attached thereto. In this view, a portion of the borehole casing 202 is shown with a sectional cutaway revealing the wire line 112 and a shuttle carrier 204 attached thereto. The wire line with the shuttle attached thereto can be spooled to extend down through the borehole as indicated by arrows 206. A shuttle 204 houses a borehole sensor array and a clamping device utilized to acoustically couple the shuttle and sensors to the borehole casing. The wire line 112 can include at least one communication line and can include at least one hydraulic pressure line. One embodiment of the communication line can be fiber optic for uphole transmission of data. The hydraulic line can be any appropriate actuator line, electronic or otherwise, that is adapted to actuate the clamp.

Figure 3:
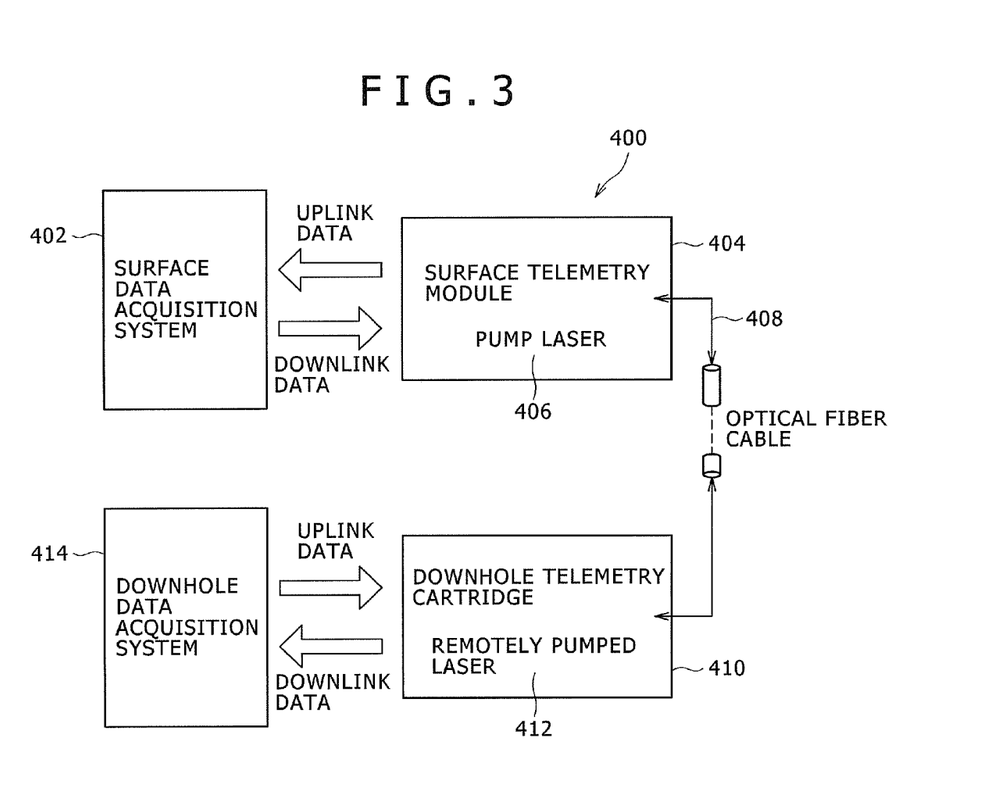
FIG. 3 is a schematic depiction of one system with a downhole telemetry cartridge according to one embodiment of the present disclosure.

FIG. 3 is a schematic depiction of a downhole system 400 according to principles of the present disclosure. The system 400 includes a surface data acquisition unit 402 in electrical communication with or as a part of a surface telemetry unit 404. The surface telemetry unit 404 may or may not be an optical telemetry module. The surface telemetry unit 404 includes a pump laser 406.

The surface telemetry unit 404 is operatively connected to a fiber optic interface 408, for example, a single optic fiber. The fiber optic interface 408 provides a high transmission rate optical communication link between the surface telemetry unit 404 and a downhole telemetry cartridge 410. The downhole telemetry cartridge 410 is part of the system 400 and includes a downhole remotely pumped laser 412.

The downhole telemetry cartridge 410 may be operatively connected to a downhole electrical tool bus (not shown). The downhole electrical tool bus provides electrical communication link between the downhole telemetry cartridge 410 and one or more downhole tools (depicted generally as downhole data acquisition system 414). The downhole tools may each have one or more sensors for measuring certain parameters in a wellbore, and a transceiver for sending and receiving data.

The downhole telemetry system of FIG. 3 may be a hybrid optical-electrical apparatus that may use standard electrical telemetry and sensor technology downhole with the advantage of the high bandwidth fiber optic interface 408 between the downhole components (optical telemetry cartridge, downhole tools) and the surface data acquisition unit.

Communications and data transfer between the surface data acquisition unit and one of the downhole tools (depicted as downhole data acquisition system 414) is now described. An electronic Down Command from the data acquisition unit 402 is sent electrically to the surface telemetry unit 404. A downlink EO modulator of the surface telemetry unit 404 modulates the electronic Down Command into an optical signal, which is transmitted via the fiber optic interface 408 to the downhole telemetry cartridge 410. Types of fiber optic interface include wireline cables comprising a single optical fiber or multiple optical fibers. A downlink OE demodulator demodulates the optical signal back into an electronic signal, and the downhole telemetry cartridge 410 transmits the demodulated electronic signal along the downhole electrical tool bus (not shown) where it is received by the downhole tool(s).

Similarly, Uplink Data from the downhole tool(s) is transmitted uphole via the downhole electrical tool bus (not shown) to the downhole telemetry cartridge 410, where it is modulated by an uplink EO modulator into an optical signal and is transmitted uphole via the fiber optic interface 408 to the surface telemetry unit 404. Sensors of the downhole tools may provide analog signals. Therefore, according to some aspects of the present disclosure, an analog-to-digital converter may be included with each downhole tool or anywhere between the downhole tools and the uplink and downlink modulators/demodulators, as desirable or necessary. Consequently, analog signals from sensors are converted into digital signals, and the digital signals are modulated by the uplink EO modulator to the surface.

According to some embodiments, the downhole remotely pumped laser 412 is input via the optical fiber 408, modulated by the EO modulator, and output via the same optical fiber 408 back to the surface optical telemetry unit 404. The uplink OE demodulator demodulates the signal back into an electronic signal, which is thereafter communicated to the data acquisition unit 402. Both uplink and downlink signals may be transmitted full-duplex using wavelength division multiplexing (WDM).

Although aspects of the present disclosure mention a multi-mode or a single-mode optic fiber, it is not intended that the disclosed embodiments be so limited. In this, the present disclosure contemplates that one or more of a single-mode and a multi-mode optic fiber cable may be used as desirable or necessary for the purposes described herein.

Figure 4A:
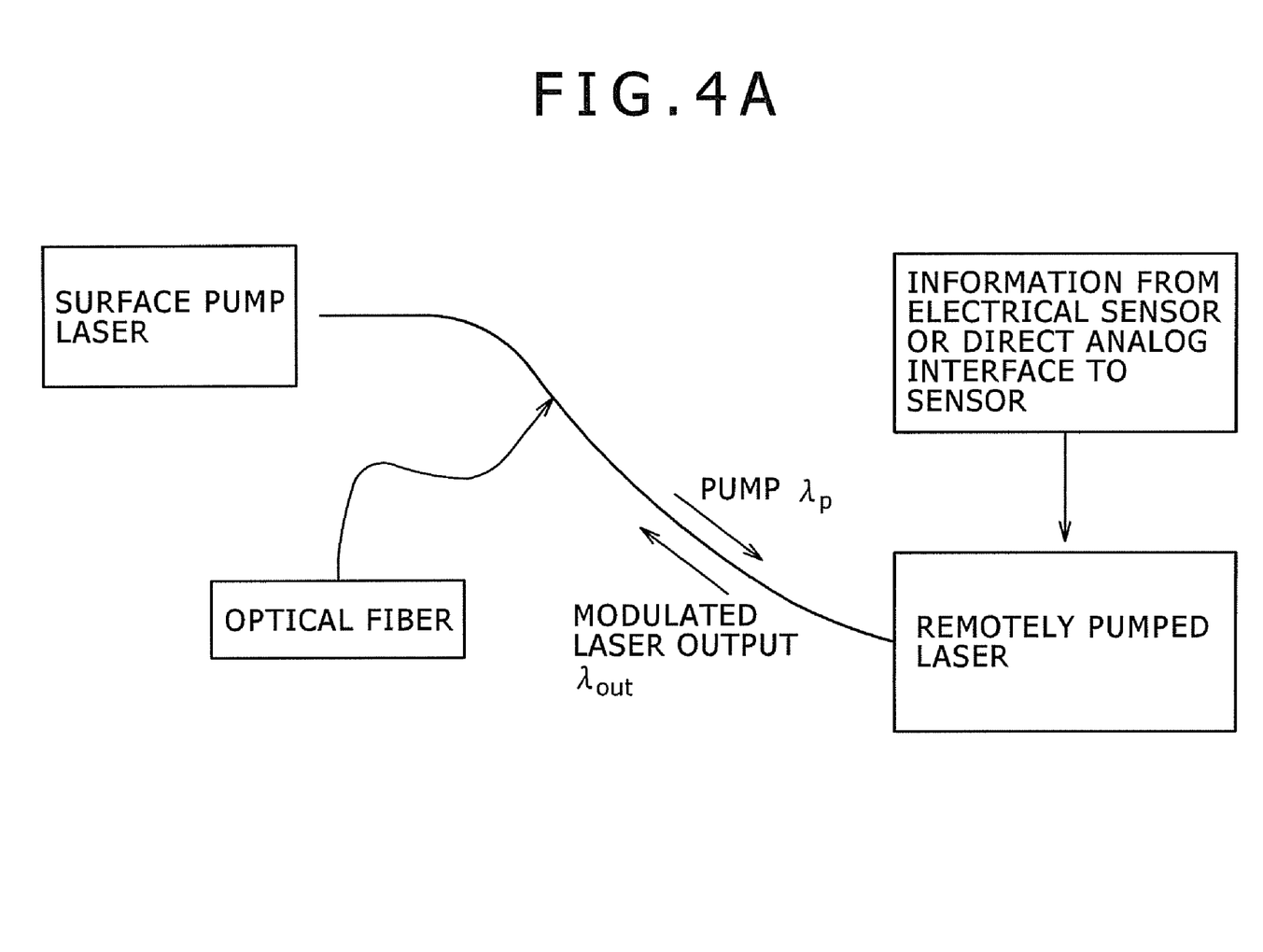
FIGS. 4(A) and 4(B) are schematic depictions of some systems with downhole sensor cartridges according to embodiments of the present disclosure.

The present disclosure contemplates utilizing high-temperature laser of the type described herein for purposes of the downhole transmitter(s) of the downhole telemetry system. Further, the remotely pumped laser of the present disclosure may be utilized in downhole systems having sensor devices that interface with the laser as schematically depicted in the exemplary embodiment of FIG. 4(A).

In certain aspects disclosed herein, the surface pump laser may have, for example, a wavelength $\lambda_p$ of 1480 nm. In this, long wavelengths such as 1480 nm are transmitted efficiently over long distances in an optical fiber. In certain embodiments, the remotely pumped laser comprises rare, earth dopant having erbium (Er) ions. The same ions can be pumped at 980 nm, although it is noted that the transmission losses at this wavelength tend to be higher. In both of the aforementioned cases, the laser output wavelength $\lambda$out would be in the region of about 1530-1580 nm.

In another possible embodiment, the present disclosure contemplates the use of Neodymium (Nd) ions which absorb, i.e., are pumped at 808 nm and at emit at around 1055-1080 nm. In this, it is noted that Nd may be appropriate for short applications due to the relatively high losses encountered both at the pump and the emission wavelength. In contrast, the 1480 nm and 1550 nm pump and emission wavelengths for Er correspond to low-loss transmission windows for high purity optical fibers.

It is further contemplated that other materials may be used and, in certain circumstances, it may be desirable for the gain medium to be different from an optical fiber. For example, the host might be a crystalline material, such as for Nd the host might be yttrium-aluminum garnet (YAG).

The present disclosure proposes that the information to be transmitted may be imparted by modulating the intensity of the laser output. For example, the information to be conveyed might be a slow on/off signal in which case a simple shutter might be used to block or transmit the laser output. For higher data rates, a modulator, such as an integrated-optic Mach-Zehnder, in which an electrical signal, carrying the information to be transmitted to the surface, alters the insertion loss of the device. Such modulators are well known to those skilled in the art and are available from commercial suppliers, such as JDS Uniphase or Alenia.

Similar integrated optic devices can also be used to modulate the intensity, frequency, phase, state of polarization, or other characteristics of the light they transmit. Other types of modulators, such as acousto-optic devices may also be used. It is noted, however, that the power consumption of such modulators is typically higher than that of integrated optical devices.

The present disclosure contemplates that a modulator placed inside the laser cavity may be used very efficiently to vary, for example, the frequency of the laser. In one possible embodiment, by stretching the laser the periodicity of its modes may be altered. Such a property can be measured very precisely at the surface.

The present disclosure proposes that an oilfield tool may comprise several elements or shuttles, each of which needs to transmit information to the surface. One example is a seismic tool which includes multiple levels i.e., shuttles, each of which records 3- or 4-axis seismic signals at a particular location. Several shuttles may be connected together at pre-arranged spacings to provide an in-well multipoint recording of seismic events. The present disclosure contemplates a plurality of remotely pumped lasers, each operating at a slightly different wavelength to transmit the output of each element of the tool. A single fiber may be used to pump the lasers and return their modulated output. The pump light may be distinguished from the pumped laser output from its wavelength and, likewise, each of the pumped laser outputs is characterized by a specific wavelength which can be distinguished from the others at the surface. It is noted that the temperature of each laser may affect its output frequency, an effect to be taken into account when planning the frequency usage in the system.

In terms of optical power transmitted and received, the pump power launched into a typical single mode fiber can be as high as a few 100 mW before the onset of non-linear effects, such as stimulated Raman scattering, begin to degrade its transmission. Typical telemetry cables for temporary measurements are required to be up to some 8 km in length. Good quality fiber has a loss below 0.3 dB/km at the wavelength of 1480 nm and, therefore, the losses to be expected in the transmission are less than 3 dB, which is equivalent to a transmission efficiency better than 50%. In this, the applicants recognized that the limitation on the number of devices that can be fitted to a single fiber will be influenced by coupling, splicing and connecting losses, rather than pure transmission loss in the fiber, provided that the loss of the fiber is not affected by the in-migration of impurities. For a high-efficiency laser cavity, a few mW of pump power are sufficient, providing a few tens of μW output. Therefore, the present disclosure contemplates in some embodiments the fitting of a few tens of lasers onto a single fiber and powered by a single source.

Figure 4B:
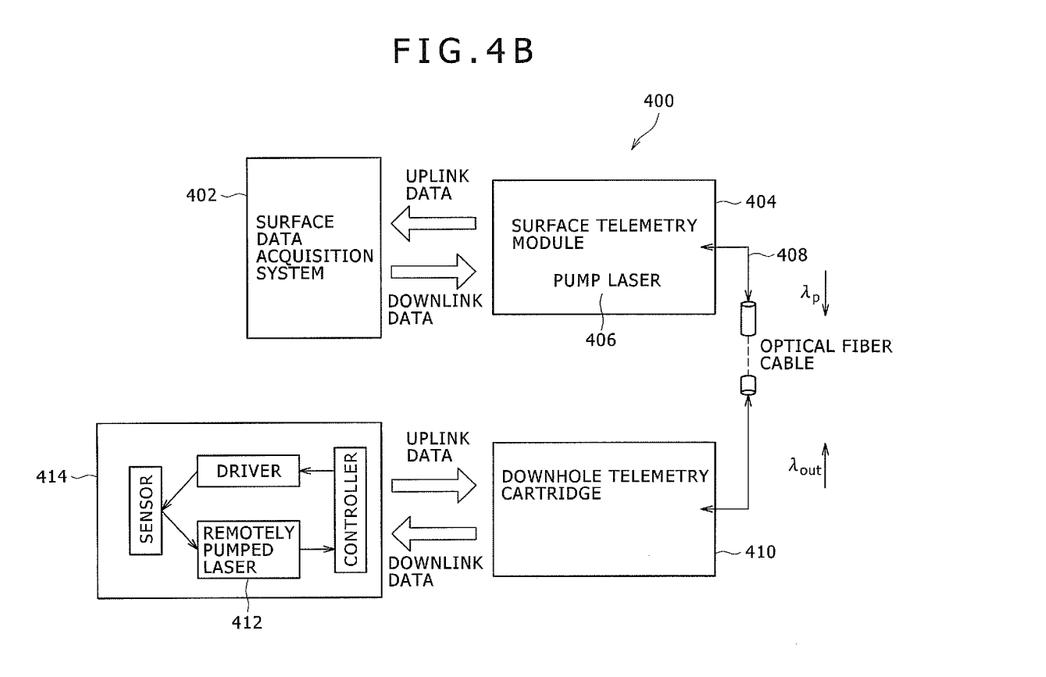

FIG. 4(B) is a schematic depiction of a downhole sensing system according to principles of the present disclosure. The downhole system 400 includes a surface data acquisition unit 402 in electrical communication with or as a part of a surface telemetry unit 404. The surface telemetry unit 404 may or may not be an optical telemetry module. The surface telemetry unit 404 includes a pump laser 406.

The surface telemetry unit 404 is operatively connected to a fiber optic interface 408, for example, a single optic fiber. The fiber optic interface 408 provides a high transmission rate optical communication link between the surface telemetry unit 404 and a downhole telemetry cartridge 410.

The downhole telemetry cartridge 410 may be operatively connected to a downhole electrical tool bus (not shown). The downhole electrical tool bus provides electrical communication link between the downhole telemetry cartridge 410 and one or more downhole tools 414. The downhole tools 414 may each have one or more sensors for measuring certain parameters in a wellbore, and a transceiver for sending and receiving data. The downhole tool 414 is part of the system 400 and includes a downhole remotely pumped laser 412.

The downhole telemetry system of FIG. 4(B) may be a hybrid optical-electrical apparatus that may use standard electrical telemetry and sensor technology downhole with the advantage of the high bandwidth fiber optic interface 408 between the downhole components (optical telemetry cartridge, downhole tools) and the surface data acquisition unit.

Communications and data transfer between the surface data acquisition unit and the downhole tools may conducted, for example, in a manner similar to the description provided above in connection with FIG. 3.

The downhole sensing system 414 of FIG. 4(B) includes a sensor, a driver, a remotely pumped laser, and a controller. The sensor may be, for example, a casing collar locator (CCL), a flow sensor, a vibration sensor, such as, acoustic, i.e., seismic, sonic, ultrasonic, accelerometer, sensors, a strain sensor, a spectrometer, pressure/temperature sensor, among others that are known to persons skilled in the art for the purposes described herein.

In one possible embodiment, the sensor of the sensing module 414 produces an electronic output signal based on sensed downhole parameters. The output signal is input to the remotely pumped laser 412 that has some characteristic, such as frequency, that encodes the measured parameter, for example, pressure. In this, the present disclosure contemplates the possibility of various types of sensing devices that are coupled or operatively associated with the remotely pumped laser 412. Sensor-laser interaction based on the sensing of downhole parameters by the sensor changes or modulates a characteristic of the pumped laser thereby encoding the light emitted from the pumped laser with the downhole sensor measurements.

As one possibility, a casing collar locator (CCL) device may be connected to the cavity of the pumped laser 412 such that signals from the CCL modulate the laser cavity. In this, a CCL senses changes in metal volume, such as pipe collars and perforations. As the downhole tool passes a collar, or some other change in metal volume, lines of magnetic flux in the CCL are disturbed causing a low frequency voltage or electromagnetic field to be induced in a coil. The signal may be used to modulate the cavity of a pumped laser.

Other mechanical, electrical, electro-chemical, optical means may be provided for the downhole sensing device to interact with the remotely pumped laser to modulate one or more characteristic of the pumped laser. For example, a remotely pumped fiber laser may be wrapped on a mandrel such that a sensing device stretches the wrapped remotely pumped fiber laser based on downhole parameters that are measured by the sensing device thereby modulating the output of the laser.

In another possible embodiment, the sensing device may measure downhole parameters by an electro-chemical means, and the output signals of the sensing device may be used to change one or more characteristic of the downhole pumped laser.

The present disclosure also contemplates a downhole laser that is coated with a sensing material responsive to change in a magnetic field based on measurements of downhole parameters. For example, in one aspect of the present disclosure an optical fiber may be coated with, for example, a coating that stretches the fiber in the presence of a magnetic field. For example, certain metallic coatings are known to have such properties and are sometimes referred to as "magno-strictive materials". Furthermore, there are also some metallic glasses that have this "magno-strictive" property.

Figure 5A:
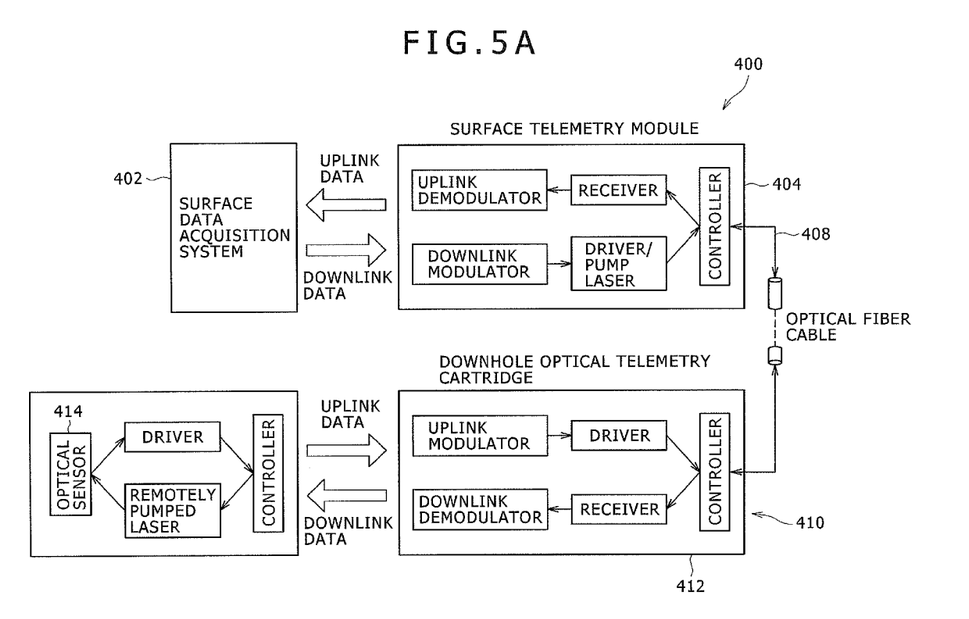
FIG. 5(A) is a schematic depiction of one system with a downhole optical sensor cartridge according to yet another embodiment of the present disclosure.

FIG. 5(A) is a schematic depiction of a high-temperature downhole system 400 with an optical sensor system according to one embodiment of the present disclosure. In the simplified representation of FIG. 5(A), a downhole optical sensing system 410 comprises an optical sensor 414 and a downhole telemetry cartridge 412 coupled to one another. A fiber optic cable 408 connects the downhole telemetry cartridge 412 with a surface telemetry module 404, which is coupled to a surface data acquisition system 402. The surface telemetry module 404 includes an uplink demodulator, a downlink modulator, a receiver coupled to the uplink demodulator, and a driver/pump laser connected to the downlink modulator. The downhole telemetry cartridge 4120 includes a downhole unit having a downlink demodulator, an uplink modulator, a receiver coupled to the downlink demodulator, and a driver coupled to the uplink modulator. The downhole optical sensing system 410 includes the optical sensor 414, a driver, a remotely pumped laser, and a controller. The sensor may be, for example, a flow sensor, a vibration sensor, such as, acoustic, i.e., seismic, sonic, ultrasonic, accelerometer, sensors, a strain sensor, a spectrometer, pressure/temperature sensor, among others that are known to a person skilled in the art for the purposes described herein.

In the optical sensing system of FIG. 5(A), optical power is supplied by the downhole remotely pumped laser. The optical power of the laser is used, for example, to excite quartz crystal pressure and/or temperature sensors into oscillation, and their resonant frequencies are detected by light modulation or motion detection techniques. Periodic optical pulses representative of the crystal resonant frequencies are then transmitted, via optical fiber 408, to the receiver/demodulator in the surface telemetry module 404. The remotely pumped laser may be used as a downhole light source to send sensor output to the surface system. The sensing system depicted in FIG. 5(A) may be generalized to sensor systems of any type.

Figure 5B:
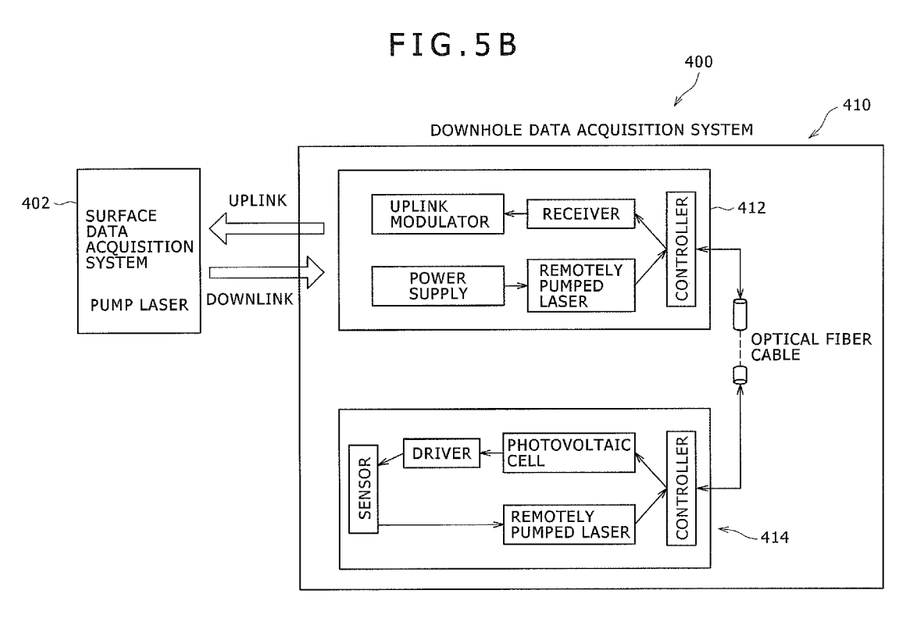
FIG. 5(B) is a schematic depiction of one system with a downhole optical power source according to one embodiment of the present disclosure.

FIG. 5(B) is a schematic depiction of another high-temperature downhole system 400 with a sensor system having a downhole power source according to one embodiment of the present disclosure. In FIG. 5(B), a downhole sensing system 410 comprises a sensor unit 414 and a downhole telemetry/power cartridge 412 coupled to one another. A fiber optic cable connects the sensor module with the downhole/power telemetry cartridge, which is coupled to a surface data acquisition system 402. The downhole telemetry/power cartridge 412 includes an uplink modulator, a receiver coupled to the uplink modulator, and a power supply unit coupled to a remotely pumped laser. The downhole sensor unit 414 includes a sensor, a photovoltaic cell, coupled to the sensor through a driver, a remotely pumped laser, and a controller. The sensor may be, for example, a pressure sensor having a pressure port (not shown) at which the sensor receives a fluid (e.g., formation fluids) whose pressure is to be measured. Within the sensor, the pressure of the fluid is sensed by a pressure transducer (not shown). The sensor receives power from the photovoltaic cell, via the driver, and produces an electronic output signal to the remotely pumped laser that has some characteristic, such as frequency, that encodes the measured pressure.

In one possible embodiment, a single fiber may convey power downhole to remote electronic devices using a downhole remotely pumped laser (e.g. a continuous (CW) laser). Note FIG. 5(B). The CW light is conveyed over a length of optical fiber to a downhole system where it is received by an opto-electrical converter, such as a photovoltaic cell. The opto-electrical converter converts the CW light into a voltage used to power downhole electronics, data converters connected to downhole sensors, and/or sensors themselves.

According to principles described herein, downhole devices including, but not limited to, acoustic, pressure, and temperature sensors, optical components requiring power such as optical switches, Bragg gratings, chemical, fluid phase, fluorescence sensors and detectors, imaging devices, video cameras, low power sensors, such as micro-sapphire gauges, associated electronics for conditioning signals received by the sensors, actuators and controls, MEMS devices or MEMS sensors, and/or integrated conditioning, support, and data conversion electronics may be powered by a downhole remotely pumped laser light source. In some cases, power provided by a downhole high-temperature optical source may not be sufficient to power sensors or support electronics, and therefore the power converted by the opto-electrical converter may be used to trickle charge or augment power supplied by downhole battery packs.

Some of the above-described methods and apparatus have applicability for both performing borehole surveys for planning well bore drilling and production and for monitoring borehole data during actual well production. Such borehole surveys include borehole seismic surveys and such monitoring of borehole data includes temporary or permanent monitoring. Fiber optic technology has the ability to multiplex multiple channels at a high data rate, thereby satisfying the demand for acoustic and seismic imaging applications which require a large sensor array with high data transmission capabilities. Use of fiber optic technology in embodiments herein also allows for a greater number of shuttles because of the smaller profile, lighter weight and the fact that no downhole electronics or power from the surface is required.

Sensors used in the borehole environment demand an ever increasing bandwidth as the demand for higher resolution sensors increases. Copper cables used for logging in the borehole are reaching the limit for the bandwidth they can provide. Fiber optic cables can provide a significantly higher bandwidth for new high resolution sensors. The use of fiber optic cables requires high-temperature downhole optical devices, and the electronics used to condition sensor signals and to provide telemetry from downhole to uphole requires electrical power.

As referred to above, fiber optic cables have very efficient transmission capabilities, frequently on the order of several hundred megabytes per second at distances up to 40 km and do not suffer from EMI or transmission loss like copper telemetry systems do. However, optic transmission systems need power to drive the associated electronics required to control the optic data transmission. An optic transmission system associated with a borehole may include a high-temperature downhole remotely pumped laser diode light source that is amplitude modulated by associated electronics. For efficient communications, in some embodiments light sources may be located both uphole and downhole to enable full duplex transmission.

Figure 6:
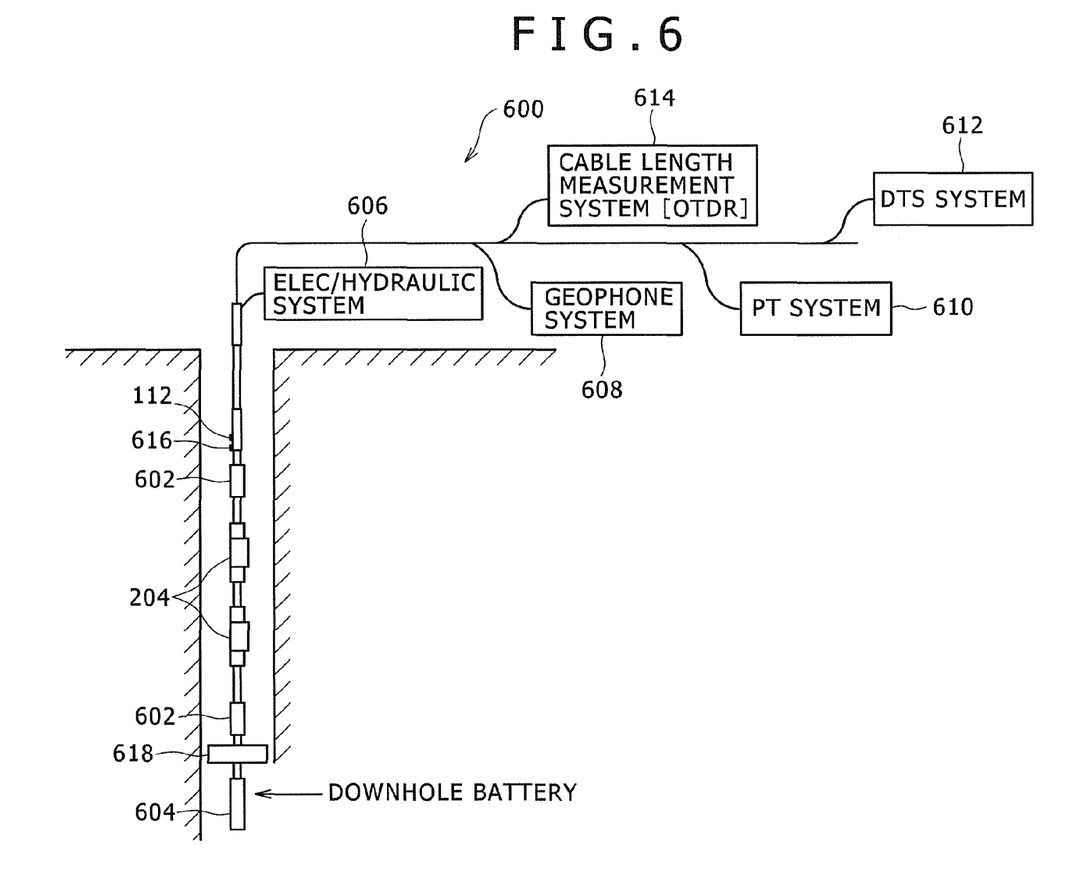
FIG. 6 is a functional diagram of one exemplary borehole seismic sensing system.

Referring to FIG. 6, a functional diagram of one embodiment of the borehole sensing apparatus 600 is shown. The apparatus 600 includes a plurality of shuttles 204 along the cable line 112 that contains a sensor and clamper package. Other sensors 602 can also be attached along the wireline such as the pressure/temperature (P/T) sensors shown in FIG. 6. The wire line 112 can be adapted to carry various communication lines, including fiber optic sensor array communication lines for the fiber optic system. The wire line 112 can also be adapted to carry the hydraulic line or electrical line actuator control for actuation of the clamper. Also shown in FIG. 6 is a downhole battery 604 that can be utilized to support various power needs. Various monitoring and control systems can be located at the surface such as the actuator control system 606 which can be operable to control actuation of the clamp. The borehole sensor system 608 can monitor, store, and interpret the data output by the sensors. Also, a P/T sensor system 610 can be located at the surface and communicably linked to a downhole sensor to monitor down-hole pressure and temperature. Still further, a distributed temperature sensor 616 is shown, which is communicably linked to a distributed temperature sensor (DTS) system 612 for providing a continuous temperature profile. Also, a cable length measurement system 614 such as an Optical Time Domain Reflectometer (OTDR) system as shown as the surface can be used. Electrical cartridge 618 is shown on the conveyance below the sensor section. In a further embodiments, the borehole sensors may be seismic sensors.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A subterranean tool configured to operate at elevated temperatures, in excess of about 115 degrees Celsius, downhole in a well traversing a formation, comprising:
a downhole telemetry cartridge configured for downhole use at temperatures in excess of about 115 degrees Celsius; and
at least one downhole light source optically connected to the telemetry cartridge, wherein
the light source comprises one or more remotely pumped lasers, the downhole remotely pumped lasers being optically connected, via one or more optical fibers, to a surface pump laser.

2. A subterranean tool according to claim 1, wherein the downhole remotely pumped lasers comprise a waveguide laser.

3. A subterranean tool according to claim 1, further comprising:
a downhole optical sensor cartridge comprising an optical sensor.

4. A subterranean tool according to claim 1, wherein the optical fiber comprises one or more of a single-mode optical fiber and a multi-mode optical fiber, the optical fiber transmitting data to and from downhole electronics and a surface data acquisition system.

5. A subterranean tool according to claim 1, wherein the surface pump laser has a wavelength in the range of about 1480 nm.

6. A subterranean tool according to claim 1, wherein the one or more remotely pumped lasers comprise a rare earth dopant having erbium (Er) ions.

7. A subterranean tool according to claim 6, wherein the surface pump laser has a wavelength in the range of about 980 nm.

8. A subterranean tool according to claim 1, wherein the one or more remotely pumped lasers have a modulated laser output in the range of about 1530-1580 nm.

9. A subterranean tool according to claim 1, wherein the one or more remotely pumped lasers comprise neodymium ions, the surface pump laser has a wavelength in the range of about 880 nm, and the one or more remotely pumped lasers emit in the range of about 1055-1080 nm.

10. A subterranean tool according to claim 1, wherein the output of the remotely pumped lasers is modulated to encode for downhole data.

11. A subterranean tool according to claim 1, wherein at least one of the frequency, intensity, phase and state of polarization of the output of the remotely pumped lasers is modulated to encode for downhole data.

12. A subterranean tool according to claim 1, wherein the one or more remotely pumped laser is coated with a sensing material that is responsive to change in a magnetic field based on measurements of downhole parameters.

13. A subterranean tool according to claim 12, wherein the sensing material coating comprises a magno-strictive material.

14. A subterranean tool according to claim 1, wherein the subterranean tool comprises a plurality of downhole shuttles.

15. A subterranean tool according to claim 14, wherein the subterranean tool comprises a plurality of downhole remotely pumped lasers structured and arranged in the plurality of shuttles;
each downhole remotely pumped laser being configured to emit at a wavelength that is different from the wavelength of other lasers of the plurality of lasers.

16. A subterranean tool according to claim 15, wherein at least one optical fiber optically connects more than one remotely pumped lasers to corresponding pump lasers at the surface;
each surface pump laser being configured to emit at a wavelength that is different from the wavelength of other surface pump lasers.

17. A downhole telemetry system, comprising:
a surface data acquisition unit comprising a surface telemetry unit;
a downhole optical telemetry cartridge comprising a downhole electro-optic unit;
at least one fiber optic interface between the surface data acquisition unit and the downhole optical telemetry cartridge;
a downhole tool; and
a downhole electrical tool bus operatively connected between the downhole electro-optic unit and the downhole tool, wherein
the downhole electro-optic unit comprises:
a remotely pumped laser optically connected, via an optical fiber, to a surface pump laser,
the downhole optical telemetry cartridge being configured to operate downhole, within a borehole, at temperatures in excess of about 115 degrees Celsius.

18. A subterranean tool configured to operate at elevated temperatures, in excess of about 115 degrees Celsius, downhole in a well traversing a formation, comprising:
a downhole telemetry cartridge configured for downhole use at temperatures in excess of about 115 degrees Celsius;
at least one downhole light source optically connected to the telemetry cartridge, wherein
the light source comprises one or more remotely pumped lasers, the downhole remotely pumped lasers being optically connected, via at least one optical fiber, to a surface pump laser; and
at least one sensor or transducer configured for sensing parameters of the formation and changing a predetermined characteristic of the one or more remotely pumped lasers based on the sensed parameters.

19. A subterranean tool according to claim 18, wherein the at least one sensor or transducer comprises an optical sensor that is at least partially powered by optical power from the remotely pumped lasers.

20. A subterranean tool according to claim 18, wherein the at least one sensor or transducer comprises an electrical sensor that is at least partially powered by electrical power converted from optical power from the remotely pumped lasers.

* * * * *